June 10, 1924.
C. C. DOLAN
1,497,093
LOCKING DEVICE FOR VEHICLES
Filed May 19, 1923
2 Sheets-Sheet 1
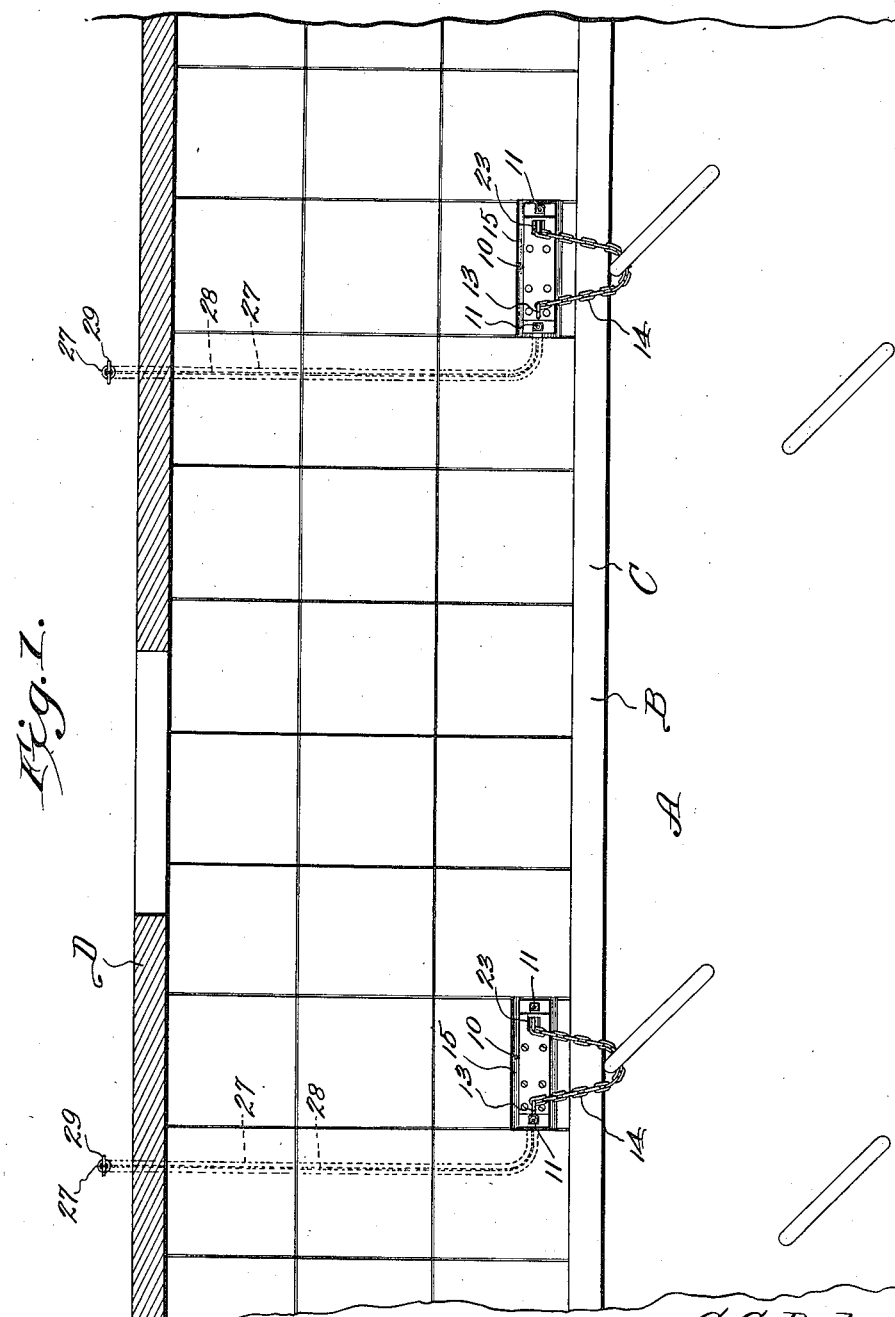

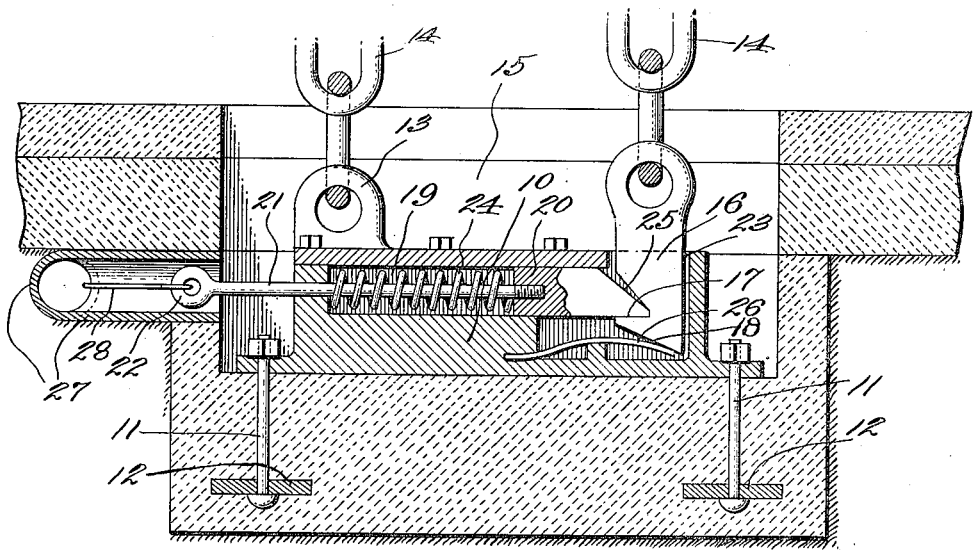
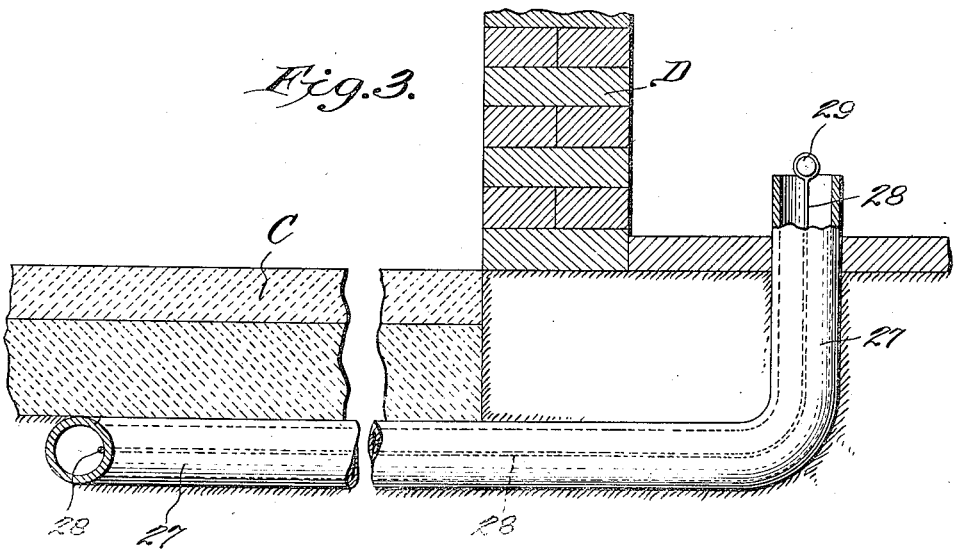

Patented June 10, 1924.

1,497,093

UNITED STATES PATENT OFFICE.

CHRISTOPHER C. DOLAN, OF RED FORK, OKLAHOMA.

LOCKING DEVICE FOR VEHICLES.

Application filed May 19, 1923. Serial No. 640,208.

*To all whom it may concern:*

Be it known that I, CHRISTOPHER C. DOLAN, a citizen of the United States, residing at Red Fork, in the county of Tulsa and State of Oklahoma, have invented new and useful Improvements in Locking Devices for Vehicles, of which the following is a specification.

This invention relates to safety devices, particularly to locks and has for its object the provision of a novel device for the purpose of locking automobiles while standing at a curb so that they cannot be stolen while they are thus parked.

An important object is the provision of a locking device of this character which is designed to be mounted at the curb and including a lock carrying flexible members designed to be engaged about a wheel or other portion of an automobile, the locking device operating automatically when engagement is effected and release being accomplished only from the inside of the building in front of which the locking device is located.

An additional object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a plan view of a portion of a street showing the curb and side walk and illustrating the mounting of my locking device, Figure 2 is an enlarged sectional view through one of the locking devices showing the parts in locked position, Figure 3 is a detail section through the street side walk and front wall of a building and showing the means for leading the operating means into the building.

Referring more particularly to the drawings the letter A designates a street, B the curb, C the side walk and D a building. In carrying out my invention I provide a locking device which is permanently located in the side walk at the curb, this device being either secured upon the side walk or having its locking structure embedded therein with the top surface flush with the surface of the side walk, the latter arrangement being preferable inasmuch as it avoids making any obstructions over which pedestrians might stumble. The device includes an elongated plate 10 suitably anchored as for instance by means of bolts 11 carrying nuts 12 embedded within the concrete or other material of which the side walk is formed. One end of the plate is provided with means 13 for attachment thereto of a chain 14 and if desired the plate may be located within a chamber 15 within which the chain is stored when not in use. The free end of the chain carries a catch 16 having a retaining shoulder 17 at one edge thereof and having its end formed with an inclined surface 18 leading to said shoulder.

One end of the plate carries a lock casing 19 within which is a longitudinally movable keeper bolt 20 carried by a stem 21 terminating in an eye 22. This casing is provided with an entrance opening 23 for the insertion of the catch 16 and the bolt 20 is urged into a position traversing this opening by means of a spring 24. This bolt has its upper surface inclined at 25 for co-operation with the inclined surface 18 of the catch, so that when the catch is inserted and pressed against the bolt the bolt will be retracted until it snaps into engagement with the shoulder 17. Secured at the bottom of the casing is a leaf spring 26 which is engaged by the catch 16 upon insertion thereof and which is compressed thereby, so that when the keeper bolt is subsequently retracted, this spring will act to force the catch out of the casing.

Embedded within the side walk is an elongated tubular housing 27 which leads into the building D and extending through this housing is a wire or other flexible member 28 which is connected with the eye 22 and which is provided inside of the building with a suitable handle 29 by means of which a pull may be exerted on the keeper bolt for releasing it from engagement with the catch.

From the foregoing description and a study of the drawings it will be apparent that I have thus provided a simply constructed and easily installed keyless locking device which may be engaged upon the wheel or other desired portion of an automobile parked at a curb for the purpose of preventing theft of an automobile or its use by an unauthorized person. A distinct feature of advantage is that there is no necessity for the employment of a key which may become lost, unlocking of the device being accomplished only from the inside of the building in front of which the vehicle is parked. Owing to the simplicity of the construction and the fewness of the parts it is apparent that there is very little to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A locking device for vehicles parked at a curb, comprising a supporting plate anchored upon the side walk at the curb, a chain having one end connected with said plate and adapted to be engaged about a portion of the vehicle, a housing carried by the plate and provided with an opening, a catch member on the free end of the chain insertable through said opening and formed with a shoulder and an inclined surface leading thereto, a spring pressed keeper bolt movable within said housing and having an inclined end co-operating with the inclined surface of the catch whereby to be retracted thereby so as to engage the shoulder, and means operable at a remote point for releasing said keeper bolt from engagement with the shoulder, said means including a tube embedded within the side walk and a flexible member connected with the keeper bolt extending through said tube and equipped with a pull handle located within the building in front of which the device is located.

2. A locking device for vehicles parked at a curb, comprising a supporting plate anchored upon the side walk at the curb, a chain having one end connected with said plate and adapted to be engaged about a portion of the vehicle, a housing carried by the plate and provided with an opening, a catch member on the free end of the chain insertable through said opening and formed with a shoulder and an inclined surface leading thereto, a spring pressed keeper bolt movable within said housing and having an inclined end co-operating with the inclined surface of the catch whereby to be retracted thereby so as to engage the shoulder, and means operable at a remote point for releasing said keeper bolt from engagement with the shoulder, and a leaf spring within the bottom of the housing engaged by said catch when in locked position and held under compression thereby, whereby to eject the catch when said keeper bolt is retracted.

In testimony whereof I affix my signature.

CHRISTOPHER C. DOLAN.